(12) United States Patent
Kaul et al.

(10) Patent No.: US 11,321,263 B2
(45) Date of Patent: May 3, 2022

(54) HIGH BANDWIDTH CORE TO NETWORK-ON-CHIP INTERFACE

(71) Applicant: Intel Corporation, Santa Clara, CA (US)

(72) Inventors: Himanshu Kaul, Portland, OR (US); Mark A. Anders, Hillsboro, OR (US); Gregory K. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1210 days.

(21) Appl. No.: 14/574,352

(22) Filed: Dec. 17, 2014

(65) Prior Publication Data
US 2016/0179728 A1 Jun. 23, 2016

(51) Int. Cl.
*H05K 7/10* (2006.01)
*G06F 13/40* (2006.01)
*H04L 49/10* (2022.01)
*H04L 12/54* (2022.01)

(52) U.S. Cl.
CPC .......... *G06F 13/4022* (2013.01); *H04L 12/54* (2013.01); *H04L 49/10* (2013.01)

(58) Field of Classification Search
CPC .... G06F 13/382; G06F 13/409; G06F 13/385; G06F 2213/0024; G06F 2213/3804; G06F 13/40; G06F 13/00
USPC .......... 710/316–317, 305–306; 370/254, 462
See application file for complete search history.

(56) References Cited

U.S. PATENT DOCUMENTS

| | | | |
|---|---|---|---|
| 8,284,766 B2 | 10/2012 | Anders et al. | |
| 2002/0048183 A1 | 4/2002 | Klein | |
| 2003/0161386 A1 | 8/2003 | Schilling | |
| 2006/0209846 A1 | 9/2006 | Clermidy et al. | |
| 2007/0226742 A1* | 9/2007 | Hung | G06F 9/4887 718/103 |
| 2008/0273531 A1* | 11/2008 | Johnson | H04L 49/201 370/390 |

(Continued)

FOREIGN PATENT DOCUMENTS

| | | |
|---|---|---|
| CN | 201134097 | 10/2008 |
| CN | 203133833 U | 8/2013 |

(Continued)

OTHER PUBLICATIONS

Hsin-Chou Chi et al., "A Switch Supporting Circuit and Packet Switching for on-Chip Networks," In Design and Diagnostics of Electronic Circuits and systems, 2006 IEEE, Apr. 18-21, 2006, pp. 224-225.

(Continued)

*Primary Examiner* — Henry Tsai
*Assistant Examiner* — Kim T Huynh
(74) *Attorney, Agent, or Firm* — Alliance IP, LLC (57) ABSTRACT

An apparatus includes a first port set that includes an input port and an output port. The apparatus further includes a plurality of second port sets. Each of the second port sets includes an input port coupled to the output port of the first port set and an output port coupled to the input port of the first port set. The plurality of second port sets are to each communicate at a first maximum bandwidth and the first port set is to communicate at a second maximum bandwidth that is higher than the first maximum bandwidth.

9 Claims, 7 Drawing Sheets

(56) References Cited

U.S. PATENT DOCUMENTS

| | | | |
|---|---|---|---|
| 2014/0118176 A1* | 5/2014 | Price | H03M 1/462 341/161 |
| 2014/0254388 A1 | 9/2014 | Kumar et al. | |
| 2014/0269751 A1* | 9/2014 | Koka | H04L 47/6205 370/413 |
| 2014/0286179 A1 | 9/2014 | Solihin | |
| 2015/0071282 A1 | 3/2015 | Anders et al. | |
| 2015/0188829 A1* | 7/2015 | Satpathy | H04L 47/2458 370/236 |
| 2015/0220470 A1 | 8/2015 | Shen et al. | |
| 2015/0331831 A1* | 11/2015 | Solihin | H04L 49/109 709/212 |

FOREIGN PATENT DOCUMENTS

| JP | 2014230261 A | 12/2014 |
|---|---|---|
| TW | 201439749 A | 10/2014 |
| WO | WO 2014/209391 | 12/2014 |

OTHER PUBLICATIONS

International Search Report and Written Opinion in International Application No. PCT/US2015/061211 dated Feb. 25, 2016.

Ruiqiang Ji et al., "Five-port optical router for photonic networks-on-chip," Optics Express, vol. 19, No. 21, Oct. 10, 2011, pp. 20258-20268.

Nilliam J. Dally et al., "Route packets, not wires: on-chip interconnection networks," In: Design Automation conference, 2001, pp. 684-689.

Anders, et al., "A 2.9Tb/s 8W 64-Core Circuit-Switched Network-on-Chip in 45 nm CMOS," IEEE, 2008, 978-1-4244-2362-0/08 (pp. 182-185).

Anders et al., "A 4.1Tb/s Bisection-Bandwidth 560Gb/s/W Streaming Circuit-Switched 8x8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

Chen et al., "A 340mV-to-0.9V 20.2Tb/s Source-Synchronous Hybrid Packet/Circuit-Switched 16x16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

Extended European Search Report for Application No. EP15870583, dated Jun. 8, 2018.

International Preliminary Report on Patentability for Application No. PCT/US2015/061211, dated Jun. 29, 2017, 7 Pages.

Notice of Allowance for Taiwan Patent Application No. TW104136028 dated Sep. 29, 2016, 4 pages.

EPO; Office Action issued in EP Patent Application No. 15870583.0, dated Mar. 31, 2021; 4 pages.

Chen, Yiqun, et al.; "Analysis of the Key Technologies of QoS Routers," Computer Engineering, Network and Communication, vol. 25, No. 12; Dec. 1999; 6 pages including English translation.

SIPO; Notice of Allowance issued in CN Patent Application No. 201580062818.9, dated Aug. 6, 2020; 7 pages including English translation.

State Intellectual Property Office of the People's Republic of China, First Office Action issued in Chinese Patent Application No. CN 201580062818.9, dated Oct. 29, 2019; 7 pages without English translation.

* cited by examiner

HIGH BANDWIDTH CORE TO NETWORK-ON-CHIP INTERFACE

FIELD

The present disclosure relates in general to the field of computer development, and more specifically, to a high bandwidth core to network-on-chip (NoC) interface.

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. Increasing on-chip communication performance typically comes at the cost of energy efficiency from increased data storage energy and/or increased usage of global wiring resources.

BRIEF DESCRIPTION OF THE DRAWINGS

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Figure 1:
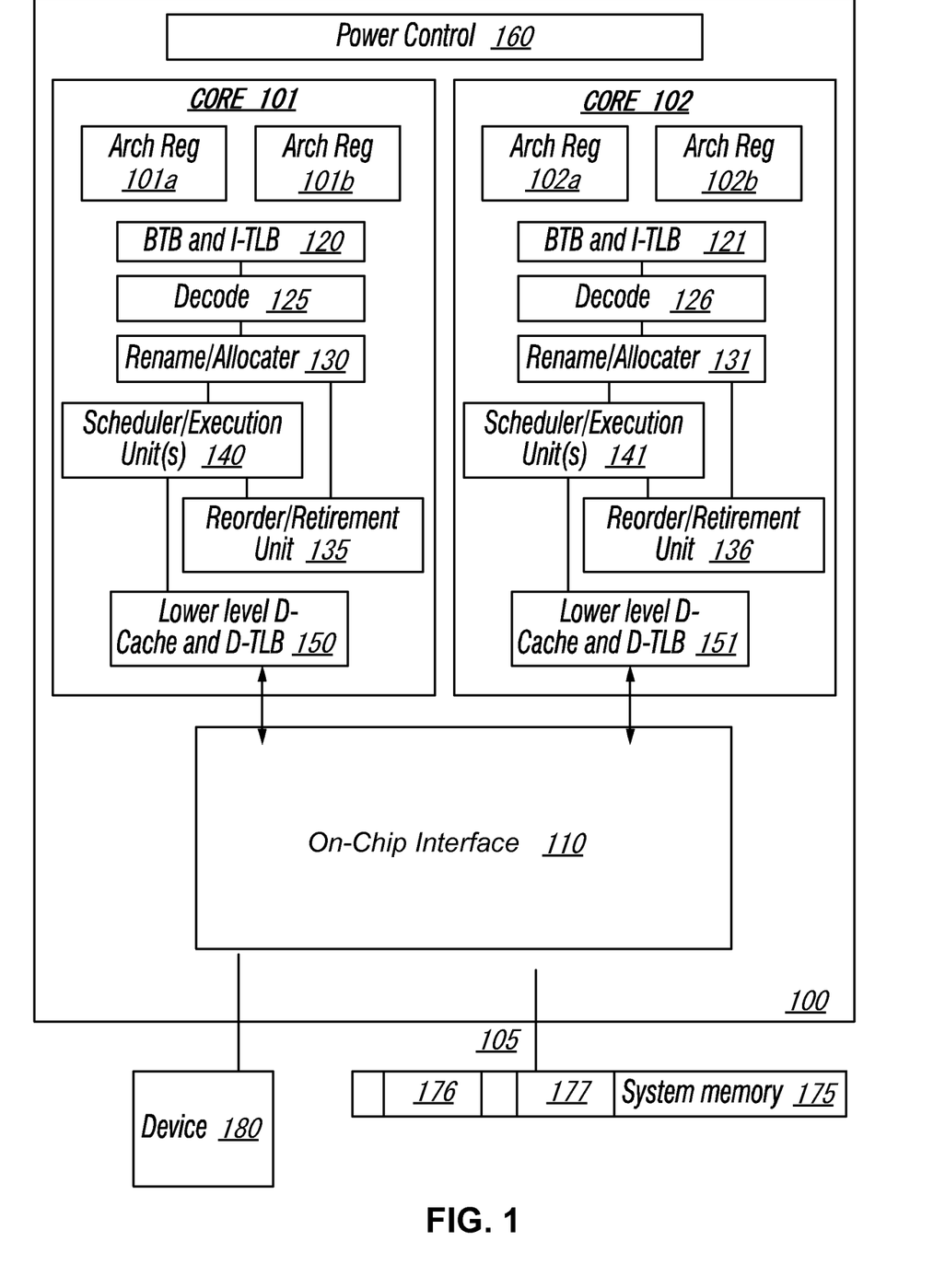
FIG. 1 illustrates a block diagram for an example computing system including a multicore processor in accordance with certain embodiments.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
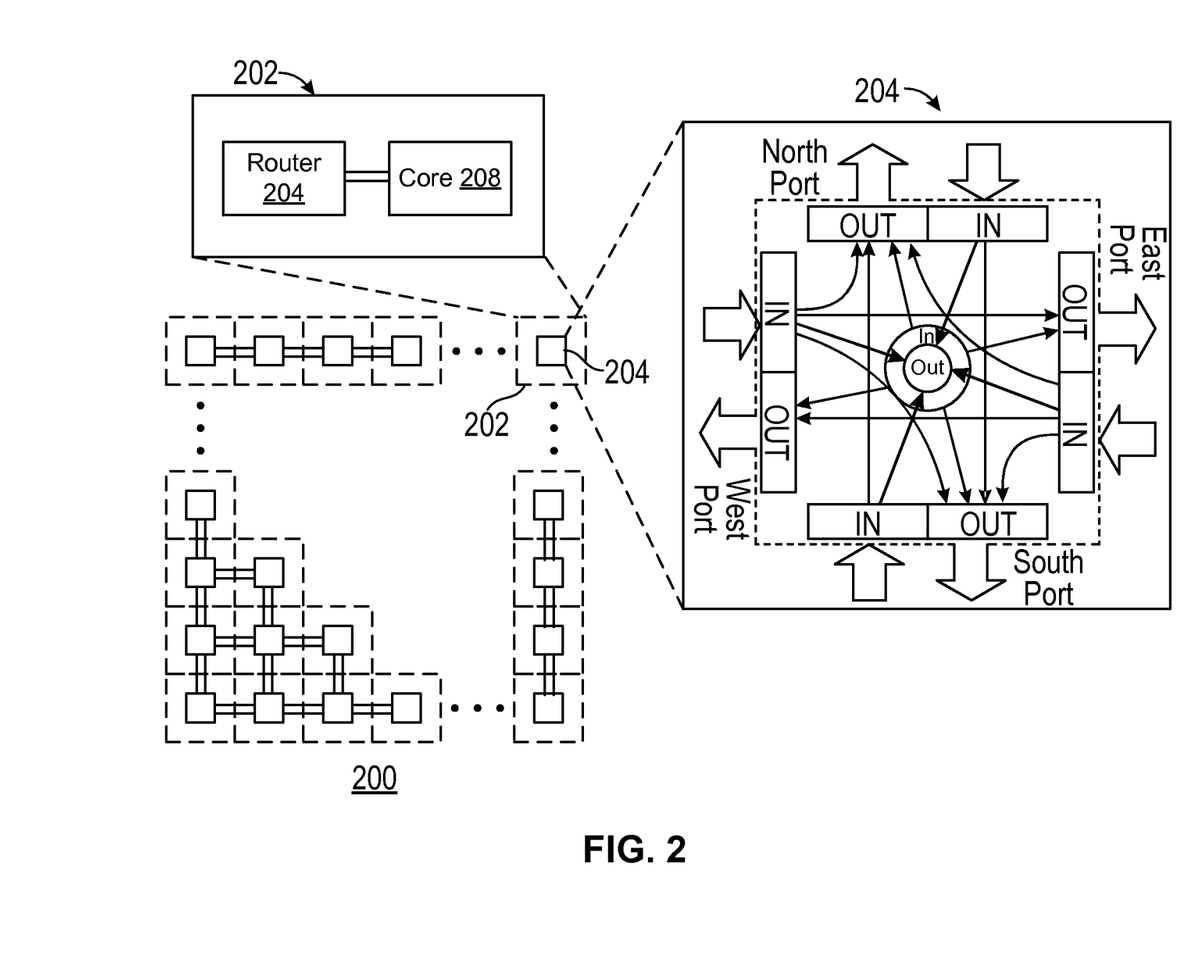
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Figure 3:
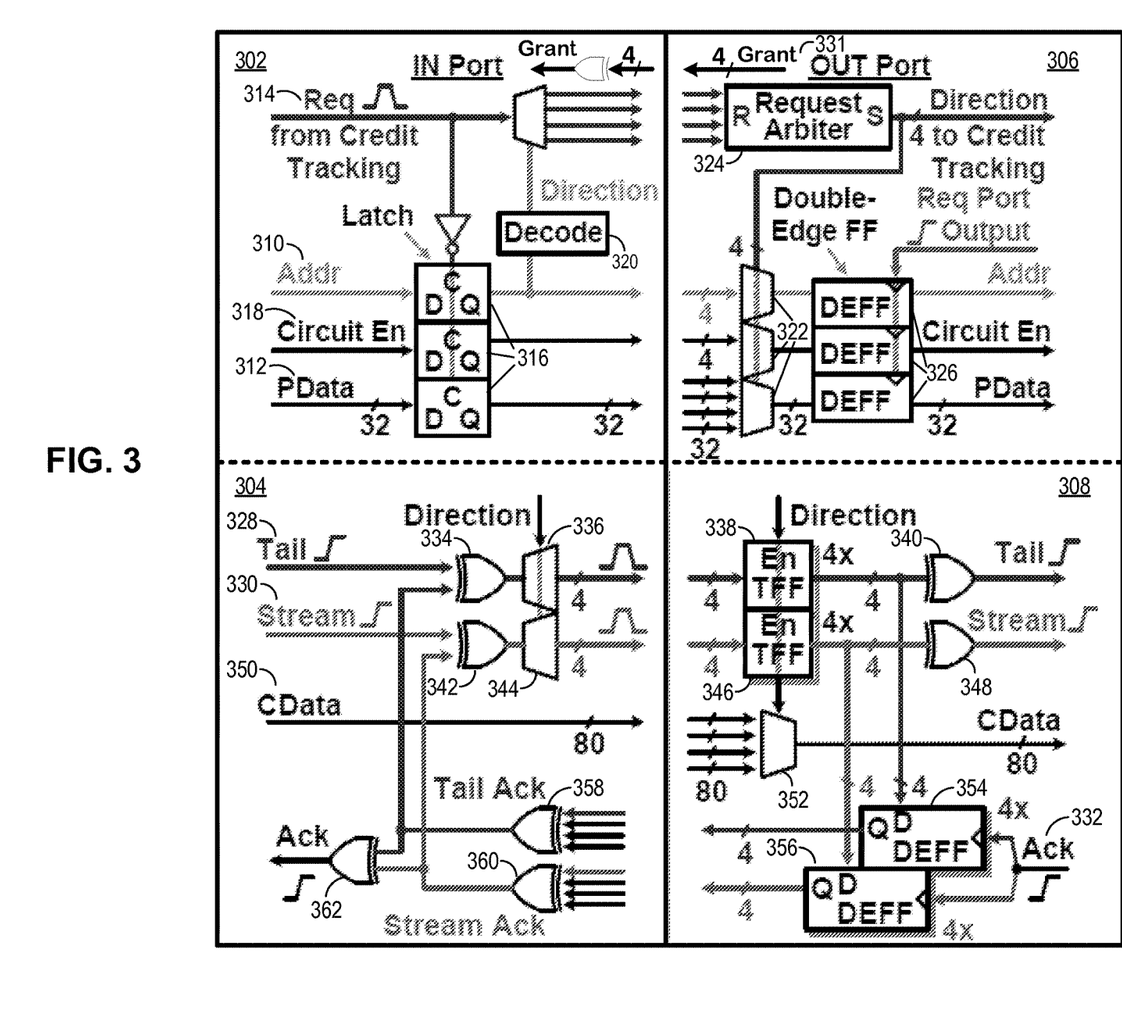
FIG. 3 illustrates example input and output ports of a router of a source-synchronous hybrid packet-circuit-switched NoC in accordance with certain embodiments.

FIG. 3 illustrates example IN and OUT ports of a router 204 of a source-synchronous hybrid packet/circuit-switched NoC in accordance with certain embodiments. The embodiment depicted assumes a router with five port sets (each port set being logically subdivided into an IN port and an OUT port), though any number of port sets may be used in other embodiments. In particular embodiments, the depicted ports may be representative of ports used in the ports other than the core port of a router (e.g., the north, east, south, and west ports). Block 302 represents a packet-switched portion of an IN port and block 304 represents a circuit-switched portion of the IN port. Similarly, block 306 represents a packet-switched portion of an OUT port and block 308 represents a circuit-switched portion of the OUT port.

A request packet may enter the IN port through block 302. In a hybrid source-synchronous NoC implementation, request packets establish circuit-switched channels between source logic located at a network element 202 and destination logic located at a different network element. To begin a data transfer, the source logic sends a reservation packet toward the destination logic. This reservation packet may be communicated via a packet-switched portion of the NoC and may reserve resources for circuit-switched data communication between source logic and destination logic as it travels from the source to the destination.

The reservation packet may include any suitable information facilitating the reservation of a circuit-switched channel. As an example, the reservation packet may include an address 310 (i.e., the address associated with the destination) and optional sideband packet data 312. The packet is forwarded downstream based on the address 310 when resources are available. For example, based on a deterministic routing method (e.g., X first, Y second routing or a table lookup) or other routing protocol performed by decoder 320 in the given router, the reservation packet is forwarded along on a path from the source logic to the destination logic. In an embodiment, a unique address may be associated with each core 208 or other logic block (and thus router 204 in cases where there is a 1:1 mapping between cores and routers). In turn, this local address may be used to generate direction information local to each router to identify the appropriate port of the router for sending the information. Thus, the address 310 may be used in conjunction with the local address of the router 204 to determine which direction to forward an incoming packet. Circuit enable signal 318 is used to determine whether the incoming packet is reserving a circuit-switched path. If the circuit enable signal 318 is not asserted, no circuit-switched path is set up, and the packet merely carries the sideband packet data 312.

Router 204 may use a credit system to allow multiple requests to be sent from one port before the first request is serviced. As an example, an OUT port may operate in accordance with a credit-2 packet system, wherein the number of sent requests from the OUT port can exceed the number of received grants by two, while an IN port may operate in accordance with a credit-1 packet system, wherein the IN port may not send additional requests until a grant is received. However, any suitable credit system may be used. The ports may include credit tracking logic to generate request signals 314 (each request signal corresponding to a reservation packet) and grant signals 331, and to track the number of requests that have been granted. Requests and grants may be transition encoded. In the IN port, a request is converted to a level-sensitive signal, demuxed using address 310, and sent to the correct OUT port. If resources are not available, the incoming packet may be blocked. If resources are available to service the packet, latches 316 receive the address 310, packet data 312, and a circuit enable signal 318. These signals are then provided to each OUT port (other than the OUT port of the port set from which they were received).

Information regarding a reservation packet is stored in a priority FIFO (not shown) associated with the IN port. In an embodiment, information from the output of decoder 320 is stored into entries of the priority FIFO. In an embodiment, this direction information, which may be two bits to identify one of four directions, is stored in the priority FIFO if the circuit enable signal 318 is asserted. The highest overall priority FIFO slot controls demuxes and muxes to establish a path for the circuit-switched control signals and data. For example, the highest priority direction stored in the IN port priority FIFO is used to control demultiplexers 336 and 344 to implement the appropriate circuit-switched channel. Thus, if a reservation packet does not have a highest priority on the path from the source logic to the destination logic, the reservation is delayed until it is the highest priority.

When a given input port is open, the incoming address 310, packet data 312, and circuit enable signal 318 are passed through latches 310 to multiplexers 322 of the appropriate OUT port. Multiplexers 322 may receive similar signals from each other input port of router 204. Request arbiter 324 chooses a request to service from the requests received from the IN ports. The output of request arbiter 324 may drive credit tracking logic in the OUT port to output a grant signal 331 to be sent to the appropriate IN port when a request from the IN port is selected by request arbiter 324. The output of request arbiter 324 is also used to select the outputs of multiplexers 322 which are then coupled to double edge triggered flip flops 326. Each OUT port may also include a priority FIFO (not shown) that is configured to receive the output of the request arbiter 324. The operation of the OUT port priority FIFO may be similar to the operation of the IN port priority FIFO. That is, the highest priority direction stored in the OUT port priority FIFO is used to control toggle flip-flops 338 and 346 and data multiplexer 352 to implement the appropriate circuit-switched channel.

The reservation packets sent via the packet-switched portions of the routers are used to establish a circuit-switched channel using the circuit-switched portions 304 and 308 of the router 204. The circuit data 350 is communicated through the IN port to each OUT port and is selected via multiplexer 352 (which may be a multiplexer latch). A latch may be used for the circuit data to prevent unnecessary glitches on the data link. In an embodiment, the latch remains open during a circuit transfer and switches only once per stream, for significantly lower clock power than packet switching.

Various elements for circuit-switched communication are controlled via control signals tail 328, stream 330, and acknowledgement 332 ("ack"). In an embodiment, two forward control signals are implemented (stream 330 and tail 328) that both designate a data transfer. The stream signal 330 indicates communication of circuit data with more data to follow (as additional segments) and thus keeps the circuit channel open for a complete circuit data transfer (of one or more segments) and the tail signal 328 indicates an end of a circuit data transfer. In the opposite direction, a reverse control signal ack 332 is sent from destination to source for each segment of the circuit data transfer. The tail signal is provided to XOR gate 334, demultiplexer 336, and consequently toggle flip-flop 338 and XOR gate 340 of an OUT port. The stream signal 330 is provided (via an exclusive-OR gate 342) and through a demultiplexer 344 (for the stream signal) and onto toggle flip-flop 346 of an OUT port and XOR gate 348. The ack signal 332 may be used to produce a tail ack signal through double edge flip flop 354 and XOR gate 358 and a stream ack signal through double edge flip flop 356 and XOR gate 360. These ack signals are converted back into a single ack signal through XOR gate 362. While the channel is held open, circuit data can be streamed to send multiple data segments (e.g., each of 80b of data), with each segment having its own ack signal 332. This amortizes circuit-switched arbitration overhead over much larger data transfers. When data streaming is complete, the final acknowledge signal 332 de-allocates the channel by incrementing the priority in all priority FIFOs along the path. This removes the completed highest-priority reservation from the FIFO, allowing subsequent circuit-switched transfers to occur.

Figure 4:
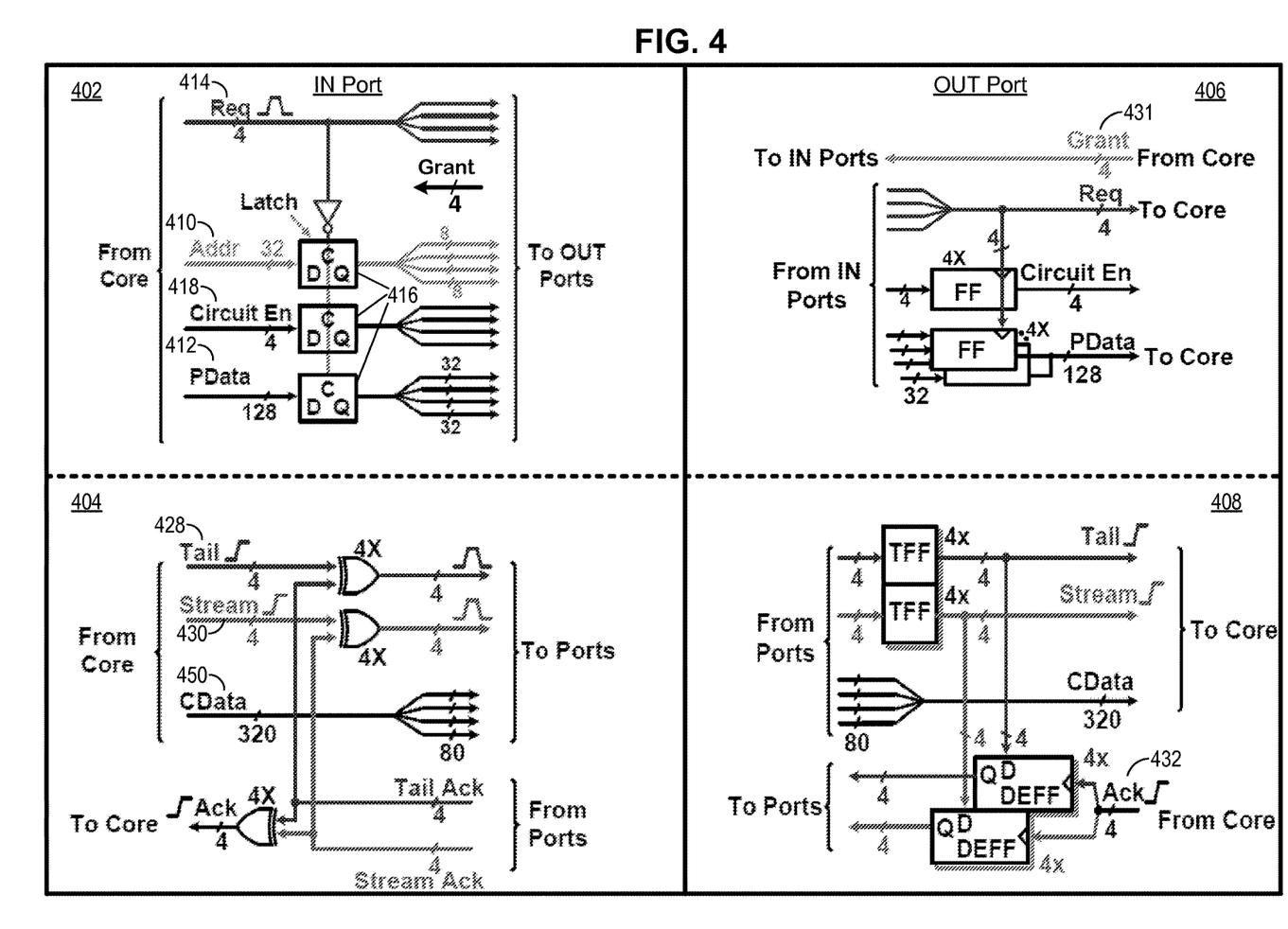
FIG. 4 illustrates example high bandwidth input and output ports of a router of a source-synchronous hybrid packet-circuit-switched NoC in accordance with certain embodiments.

FIG. 4 illustrates example high bandwidth IN and OUT ports of a router 204 of a source-synchronous hybrid packet-circuit-switched NoC in accordance with certain embodiments. The embodiment depicted again assumes a router having five port sets (each port set being logically subdivided into an IN port and an OUT port), though any number of port sets may be used in other embodiments. Block 402 represents a packet-switched portion of an IN port and block 404 represents a circuit-switched portion of the IN port. Similarly, block 406 represents a packet-switched portion of an OUT port and block 408 represents a circuit-switched portion of the OUT port. In particular embodiments, the IN and OUT ports depicted in FIG. 4 are used to interface with core 208 or another logic block. Thus, in some embodiments, one or more cores of the NoC may utilize a high bandwidth IN and/or OUT port to communicate while the other ports of the routers 204 associated with the cores may be implemented with the IN and/or OUT port structures shown in FIG. 3 or variants thereof. Thus the other ports may have a uniform bandwidth while the core port has a bandwidth that is higher than that of the other ports. Bandwidth may indicate the amount of data communicated by a particular port over a period of time. When the core IN port is servicing requests to all of the OUT ports of the other port sets, it is operating at its maximum bandwidth. Similarly, when the core OUT port is servicing requests from all of the IN ports of the other ports sets, it is operating at its maximum bandwidth.

For traffic entering the core 208 from the network (via an IN port of a different port set of the router), the core port can simultaneously receive data from multiple ports (or a selected subset thereof). Similarly, for traffic leaving the core 208 to the network, the core port can simultaneously provide independent data to all the other ports (or a selected subset thereof). Thus, the core port does not need to arbitrate between incoming data from different ports or for outgoing data from the core to the network. This allows the omission of arbitration circuits and data multiplexers and demultiplexers that may be utilized in the other ports to select a request from more than one incoming or outgoing requests. In such embodiments, the maximum data bandwidth for the core port increases by four times relative to the other ports for a router having five port sets, enabling removal of data packets from the network at much higher rates to reduce network congestion and latency while improving total NoC throughput. Increasing only the core bandwidth avoids increasing the global wiring resources and data storage energy that would be required in order to increase the bandwidth of all of the ports of a router.

The control signals and data signals of FIG. 4 may have any suitable characteristics of the corresponding signals of FIG. 3. As depicted, the IN port has dedicated wiring for data signals and control signals from the core to each router OUT port (other than the core OUT port) to enable simultaneous transfer of data from the core to each OUT port of the router. On the control signal side, separate request signals 414, address signals 410, circuit enable signals 418, tail signals 428, and stream signals 430 may be sent to each OUT port and separate ack signals 432 (one for each IN port other than the core IN port) may be sent from the core. On the data signal side, separate sideband packet data 412 and circuit data 450 is sent to each OUT port. Because the IN port allows requests to go directly to the OUT ports, the IN port does not need to arbitrate between requests and thus the priority FIFO on the IN port may be omitted. Similarly, the direction decoder 320 may be omitted because each OUT port has dedicated wiring from the core. In such embodiments, the core may include logic enabling the core to send data to the correct port. For example, the core may include logic that allows the core to determine a suitable OUT port based on a destination address associated with the data.

As depicted, the core OUT port has dedicated wiring for data signals and control signals from the core to each router IN port to enable simultaneous transfer of data from the IN ports to the core 208 via the OUT port of the core router. For a router having five port sets, the core OUT port enables the core to receive four times the data width with dedicated control signals for data from each IN port of the router and enables the core to respond with a dedicated ack signal for each IN port. On the control signal side, separate grant signals 431 and ack signals 432 may be sent to each IN port and separate request signals 314, address signals 310, circuit enable signals 318, tail signals 328, and stream signals 330 may be received from each IN port (other than the core IN port). On the data signal side, separate sideband packet data 312 and circuit data 350 is received from each IN port (other than the core IN port). Because the OUT port of the high bandwidth port allows circuit-switched data to be accepted from each other port simultaneously, a request arbiter and a priority FIFO is not needed for the core OUT port.

FIGS. 3 and 4 illustrate ports that may be used in a high bandwidth core-network interface for hybrid packet-circuit-switched data transmissions in the context of source-synchronous NoCs. In source-synchronous NoCs, control signal transitions forwarded along with the data act as clock signals, thus eliminating the need for a fully-synchronous clock. This technique facilitates multi-clock designs (wherein cores associated with different routers may operate at different frequencies) by removing the need for synchronizing FIFOs at each router. However, the illustrated embodiments can be easily adapted to work with fully-synchronous NoCs with explicit clocks and level sensitive control signals. A synchronous packet-switched NoC may comprise routers that communicate with their neighbors based on a global clock. Thus, all the routers in a synchronous NoC operate at the same frequency. In various synchronous implementations, no explicit credit tracking circuits are required since the placement of flip-flops and latches along with grant and request based clock-gating of storage elements may achieve the same result. The clock for the circuit-switched network may be derived from the clock for the packet-switched network and may be a multiple of the clock of the packet-switched network to account for the worst-case circuit-switched channel setup. Synchronized packet and circuit-switched network clocks also eliminate the need for priority FIFOs to handle write and read operations from independent clock domains.

Figure 5:
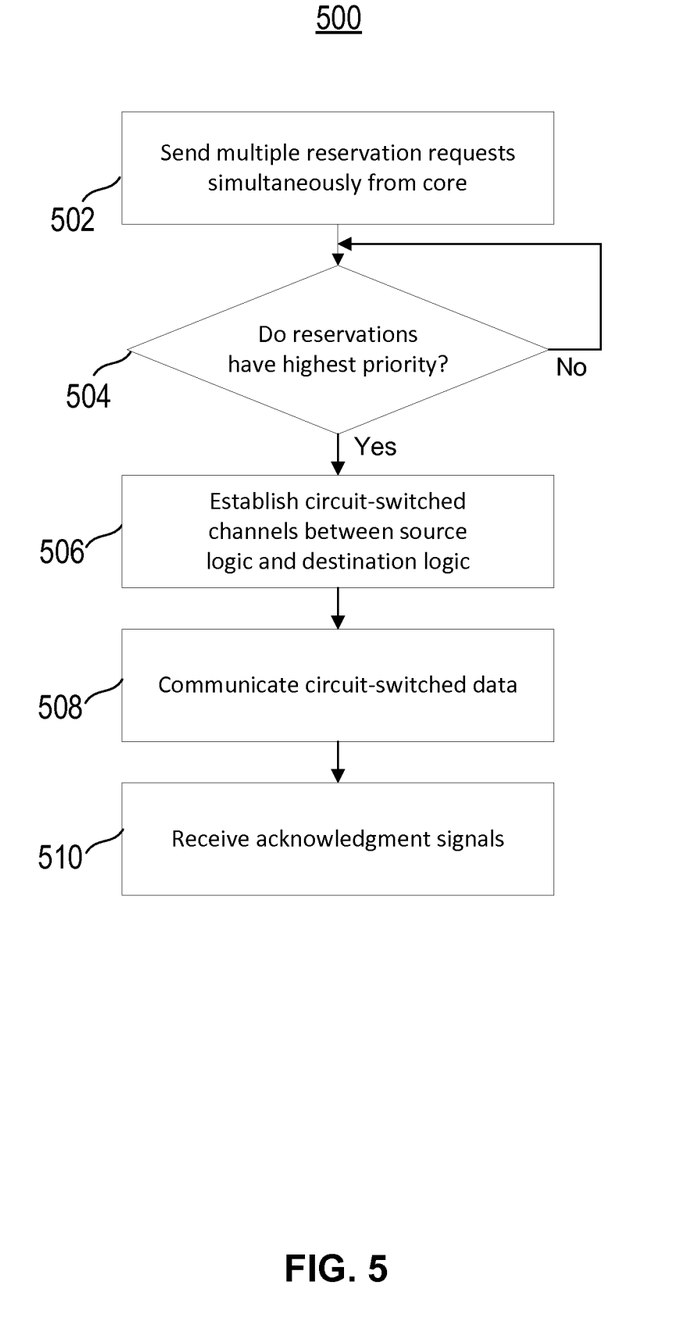
FIG. 5 illustrates an example method for communicating data from source logic using a high bandwidth port set in accordance with certain embodiments.

FIG. 5 illustrates an example method 500 for communicating data from source logic using a high bandwidth port set in accordance with certain embodiments. The method 500 begins at step 502 where multiple reservation requests are sent simultaneously by the source logic (e.g., core 208) to the core IN port (though multiple reservation requests need not be sent simultaneously each time a reservation request is sent). These reservation requests may each include a reservation packet communicated via a packet-switched portion of the NoC. Each reservation packet may include an address 410 (and optional packet data 412) of the destination logic. The source logic sends each reservation packet through the core IN port on a dedicated channel to the appropriate OUT port of the router 204. Reservation packets may be sent simultaneously over two or more of the dedicated channels. For example, the source logic may simultaneously send a first reservation request to a North OUT port and a second reservation request to a South OUT port. As another example, the source logic may simultaneously send separate reservation requests to all of the OUT ports (other than the core OUT port). In conjunction with the reservation requests, control signals (e.g., request signals 414 or circuit enable signals 418) may be sent along dedicated channels to each OUT port (other than the core OUT port) to facilitate establishment of the reservations. Each OUT port forwards its received reservation request to another router on a path to the destination logic. For example, based on a lookup or other routing protocol performed in the given router, the reservation packets are forwarded along on a path from the source logic to the destination logic.

At step 504, it is determined whether each reservation has a highest priority on the path from the source logic to the respective destination logic. For example, if each priority FIFO from the source to the destination includes an entry associated with the reservation in the highest priority slot of the FIFO, the reservation may be considered to have the highest priority. If the reservation does not have the highest priority, the reservation waits until it has the highest priority, where a circuit-switched channel is established between the source logic and the destination logic at step 506. In order to establish a circuit-switched channel, appropriate control signals may be sent to control various demultiplexers (e.g., to pass handshaking signals 328 and 330) and multiplexers (e.g., to pass circuit data 350) at each router along the path from the source logic to the destination logic. In various embodiments, the control signals are sent from the priority FIFOs of the respective routers. However, since a dedicated channel exists from the core IN port to each OUT port of the other port sets, no such demultiplexers are needed for tail signal 328 and stream signal 330 at the core IN port in order to establish the circuit-switched channel (thus no priority FIFO is needed in the core IN port).

Multiple circuit-switched channels from the source logic may exist simultaneously. As an example, a first circuit-switched channel may be established from the source logic, through the north OUT port and on to destination logic while a second circuit-switched channel may be established from the source logic, through the south OUT port and on to other destination logic. As another example, circuit-switched channels may simultaneously exist from the source logic and through each of the OUT ports (other than the core OUT port).

After an establishment of a circuit-switched channel, data communication between the source logic and the destination logic occurs over that circuit-switched channel at step 508. Two or more transfers from the source logic to different destination logic may occur simultaneously. Each transfer may include one or more segments of data, whose size is set by the data bus. In an embodiment with circuit streaming, multiple segments can be communicated from the source logic to the destination logic before the channel is closed. As explained above, in one embodiment, communication is performed using two-phase handshaking with forward (stream, tail) and reverse (ack) handshaking signals sent over dedicated channels from the core to each other port. At step, 510, the source logic receives an acknowledgment indicating successful receipt of the each circuit-switched segment transfer communicated. For each circuit-switched channel, when the last ack signal is received, the circuit-switched channel is closed.

Some of the steps illustrated in FIG. 5 may be combined, modified or deleted where appropriate, and additional steps may also be added to the flowchart. Additionally, steps may be performed in any suitable order without departing from the scope of particular embodiments.

Figure 6:
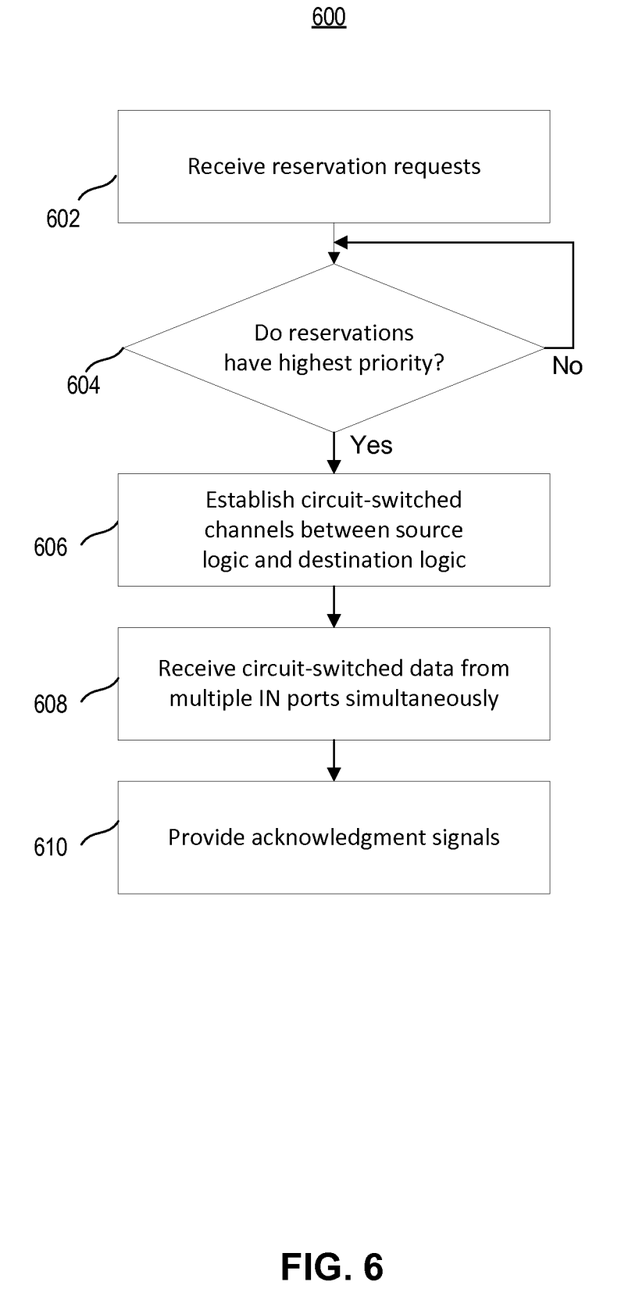
FIG. 6 illustrates an example method for communicating data to destination logic using a high bandwidth port set in accordance with certain embodiments.

FIG. 6 illustrates an example method for communicating data to destination logic using a high bandwidth port set in accordance with certain embodiments. The method 600 begins at step 602 where reservation requests are received by destination logic (e.g., core 208). The destination logic may have dedicated channels to receive reservation requests from each IN port of the router (other than the core IN port). Accordingly, reservation packets may be received simultaneously over two or more of the dedicated channels. For example, the destination logic may simultaneously receive a first reservation request from a north IN port and a second reservation request from a south IN port. As another example, the destination logic may simultaneously receive separate reservation requests from all of the IN ports (other than the core IN port). In conjunction with the reservation requests, control signals (e.g., request signals 414 or circuit enable signals 418) may be received along dedicated channels from each IN port (other than the core IN port).

At step 604, it is determined whether each reservation has a highest priority on the path from the respective source logic to the destination logic. If the reservation does not have the highest priority, the reservation waits until it is the highest priority, where a circuit-switched channel is established between the source logic and the destination logic at step 606. As explained earlier, in order to establish a circuit-switched channel, appropriate control signals may be sent to control various demultiplexers and multiplexers at each router along the path from the source logic to the destination logic. However, since dedicated channels exist between the core OUT port and each IN port of the other port sets of the router of the destination logic, no multiplexers are needed at the core OUT port in order to establish the circuit-switched channel. Moreover, all of the toggle flip-flops may be enabled since four parallel tail signals 428 and stream signals 430 may be received by the core. Thus, no priority FIFO is needed in the core OUT port to select a set of data or a tail signal or stream signal, as is necessary in the other OUT ports.

Multiple circuit-switched channels to the destination logic may exist simultaneously. As an example, a first circuit-switched channel may be established from a first source logic, through the north IN port and to the destination logic while a second circuit-switched channel may be established from a second source logic, through the south IN port, and to the destination logic. As another example, circuit-switched channels may simultaneously exist through each of the IN ports (other than the core IN port) of a router to the destination logic through the core OUT port.

After an establishment of a circuit-switched channel, data communication between the source logic and the destination logic occurs over that circuit-switched channel at step 608. As indicated, two or more transfers from different source logic to the destination logic may occur simultaneously (though this is not necessarily the case each transfer). Each transfer may include one or more segments of data, whose size is set by the data bus. In an embodiment with circuit streaming, multiple segments can be communicated from the source logic to the destination logic before the channel is closed. As explained above, in one embodiment, communication is performed using two-phase handshaking with forward (stream, tail) and reverse (ack) handshaking signals sent over dedicated channels to and from the core OUT port to each IN port of the other port sets. At step, 610, the destination logic sends an acknowledgment indicating successful receipt of each circuit-switched segment transfer communicated. For each circuit-switched channel, when the last ack signal is received by the respective source logic, the circuit-switched channel is closed.

Some of the steps illustrated in FIG. 6 may be combined, modified or deleted where appropriate, and additional steps may also be added to the flowchart. Additionally, steps may be performed in any suitable order without departing from the scope of particular embodiments.

Figure 7:
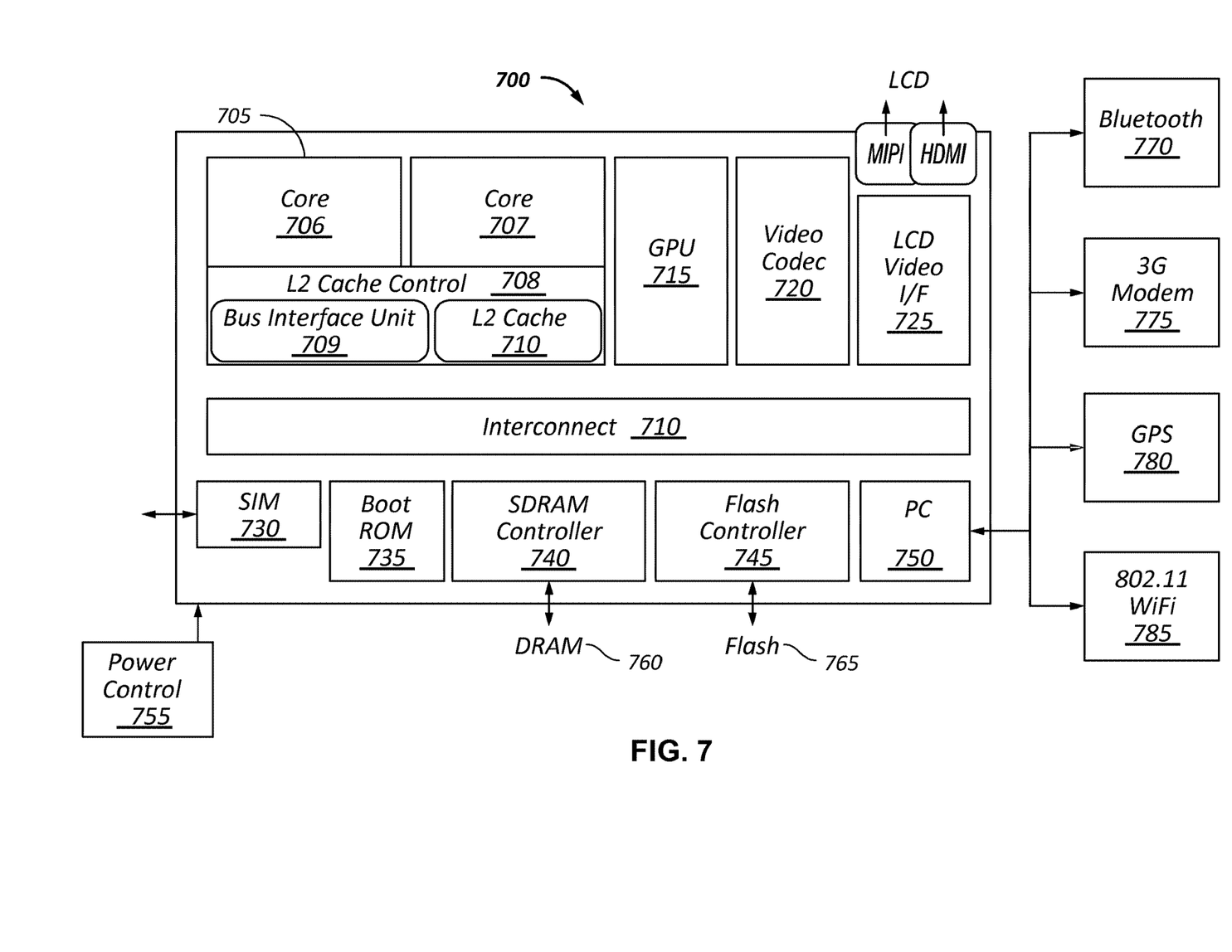
FIG. 7 illustrates another block diagram for an example computing system in accordance with certain embodiments.

FIG. 7 illustrates another embodiment of a block diagram for an example computing system in accordance with one embodiment. In this figure, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc.

(AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 710 includes an on-chip interconnect, such as an IOSF, AMBA, or other interconnect discussed above, which potentially implements one or more aspects of the described disclosure.

Interface 710 provides communication channels to the other components, such as a Subscriber Identity Module (SIM) 730 to interface with a SIM card, a boot rom 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 785, and WiFi 785. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic, and a method wherein a first router is to comprise a plurality of port sets including a first port set to comprise an input port and an output port and a second plurality of port sets each to comprise an input port to be coupled to the output port of the first port set and an output port to be coupled to the input port of the first port set. The input port of the first port set is to simultaneously provide circuit-switched data from a core of the processor to each port set of the second plurality of port sets, and wherein the output port of the first port set is to simultaneously provide circuit-switched data from each port set of the second plurality of port sets to the core.

In at least one example, the apparatus is a processor.

In at least one example, an output port of a port set of the second plurality of port sets is further to be coupled to an input port of a second port set of the second plurality of port sets, and an input port of the port set of the second plurality of port sets is further to be coupled to an output port of the second port set of the second plurality of port sets.

In at least one example, the input port of the first port set is further to simultaneously provide packet-switched data from the core to the second plurality of port sets.

In at least one example, the output port of the first port set is further to simultaneously provide packet-switched data from the second plurality of port sets to the core.

In at least one example, an input port of a port set of the second plurality of port sets is to receive data from a corresponding port of another router of the processor.

In at least one example, an output port of a port set of the second plurality of port sets is to provide data received from the core to a corresponding port of another router of the processor.

In at least one example, the processor is further to comprise a plurality of routers to communicate with the first router through the second plurality of port sets.

In at least one example, a die is to comprise the processor.

In at least one example, the plurality of routers are to communicate according to a source-synchronous protocol.

In at least one example, the plurality of routers are to communicate according to a synchronous protocol.

In at least one example, the output port of the first port set is further to comprise a first plurality of flip flops sets, each flip flop set of the first plurality of flip flop sets to store packet data provided by a distinct input port of the second plurality of port sets, wherein each flip flop set of the first plurality of flip flop sets is to be enabled simultaneously.

In at least one example, an output port of the second plurality of port sets is further to comprise a plurality of flip flops, each flip flop of the plurality of flip flops to store packet data is to be provided by an input port of the second plurality of port sets or the input port of the first port set.

In at least one example, the input port and the output port of the first port set are each to comprise an equal number of circuit-switched data carrying wires entering the respective port and exiting the respective port and the input port and the output port of the first port set are each to comprise an equal number of packet-switched data carrying wires entering the respective port and exiting the respective port.

In at least one example, the first port set does not arbitrate between data received simultaneously at the output port of the first set from the input ports of the second plurality of port sets and the first port set does not arbitrate between data sent simultaneously from the input port of the first set to the output ports of the second plurality of port sets.

One or more embodiments may provide an apparatus, a system, a machine readable storage, a machine readable medium, hardware- and/or software-based logic, and a method wherein a first port set is to comprise an input port and an output port, a plurality of second port sets are each to comprise an input port coupled to the output port of the first port set and an output port coupled to the input port of the first port set. The plurality of second port sets are to each communicate at a first maximum bandwidth and the first port set is to communicate at a second maximum bandwidth that is higher than the first maximum bandwidth.

In at least one example, a core is to receive data from the output port of the first port set and to provide data to the input port of the first port set.

In at least one example, a plurality of connections are to each couple the input port of the first port set to a distinct output port of the second port sets.

In at least one example, a first connection of the plurality of connections is to communicate first circuit-switched data from the input port of the first port set to an output port of a port set of the plurality of second port sets, a second connection of the plurality of connections is to communicate second circuit-switched data from the input port of the first port set to an output port of a second port set of the plurality of second port sets, and the first circuit-switched data and the second circuit-switched data are simultaneously communicated by the first connection and second connection.

In at least one example, a first connection of the plurality of connections is to communicate a first control data to establish a first circuit-switched data connection from the input port of the first port set, a second connection of the plurality of connections is to communicate a second control data to establish a second circuit-switched data connection from the input port of the first port set, and the first control data and the second control data are simultaneously communicated by the first connection and the second connection.

One or more embodiments may provide a non-transitory machine readable medium including information to represent structures, when manufactured, to be configured to provide, from a core of a processor, first circuit-switched data to a first input port of a router and simultaneously communicate a first portion of the first circuit-switched data from the first input port of the router to a first output port of the router and a second portion of the first circuit-switched data from the first input port of the router to a second output port of the router.

In at least one example, the structures, when manufactured, are to be further configured to receive a first portion of second circuit-switched data at a second input port of the router and a second portion of second circuit-switched data at a third input port of the router, and simultaneously communicate, by the second and third input ports, the first and second portions of the second circuit-switched data to the core of the processor via a third output port of the router.

One or more embodiments may provide an apparatus, a system, a machine readable storage, a machine readable medium, hardware- and/or software-based logic to comprise a plurality of cores each associated with a router of a network on a chip, each of the routers comprising a first port set to comprise an input port and an output port and a plurality of second port sets. Each of the second port sets is to comprise an input port coupled to the output port of the first port set and an output port coupled to the input port of the first port set. The plurality of second port sets are to each communicate at a first maximum bandwidth and the first port set is to communicate at a second maximum bandwidth that is higher than the first maximum bandwidth.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a first router comprising a plurality of port sets, wherein the plurality of port sets comprise:
   a first port set comprising an input port and an output port;
   a second plurality of port sets, wherein each port set of the second plurality of port sets comprises: an input port to be coupled to the output port of the first port set; and
   an output port to be coupled to the input port of the first port set; and
   wherein the input port of the first port set is to simultaneously provide circuit-switched data from a core of the processor to each port set of the second plurality of port sets, and wherein the output port of the first port set is to simultaneously provide circuit-switched data from each port set of the second plurality of port sets to the core, wherein the output port of the first port set is further to comprise a first plurality of flip flops sets, each flip flop set of the first plurality of flip flop sets to store packet data provided by a distinct input port of the second plurality of port sets, wherein each flip flop set of the first plurality of flip flop sets is to be enabled simultaneously.

2. The processor of claim 1, wherein an output port of the second plurality of port sets is further to comprise a plurality of flip flops, each flip flop of the plurality of flip flops to store packet data provided by an input port of the second plurality of port sets or the input port of the first port set.

3. A processor comprising:
   a first router comprising a plurality of port sets, wherein the plurality of port sets comprise:
   a first port set comprising an input port and an output port;
   a second plurality of port sets, wherein each port set of the second plurality of port sets comprises: an input port to be coupled to the output port of the first port set; and
   an output port to be coupled to the input port of the first port set; and
   wherein the input port of the first port set is to simultaneously provide circuit-switched data from a core of the processor to each port set of the second plurality of port sets, and wherein the output port of the first port set is to simultaneously provide circuit-switched data from each port set of the second plurality of port sets to the core, wherein:

the first port set does not arbitrate between data received simultaneously at the output port of the first port set from the input ports of the second plurality of port sets; and the first port set does not arbitrate between data sent simultaneously from the input port of the first port set to the output ports of the second plurality of port sets.

4. An apparatus comprising:
a first port set to comprise an input port and an output port;
a plurality of second port sets, wherein each of the second port sets comprises:
an input port coupled to the output port of the first port set;
an output port coupled to the input port of the first port set; and
wherein the plurality of second port sets are to each communicate at a first maximum bandwidth when fully utilized and the first port set is to communicate at a second maximum bandwidth when fully utilized, the second maximum bandwidth higher than the first maximum bandwidth.

5. The apparatus of claim 4, further to comprise a core that is to receive data from the output port of the first port set and to provide data to the input port of the first port set.

6. The apparatus of claim 4, further to comprise a plurality of connections, each connection to permanently couple the input port of the first port set to a distinct output port of the second port sets.

7. A system to comprise:
a plurality of cores each associated with a router of a network on a chip, each of the routers comprising:
a first port set to comprise an input port and an output port;
a plurality of second port sets, wherein each of the second port sets is to comprise:
an input port coupled to the output port of the first port set;
an output port coupled to the input port of the first port set; and
wherein the plurality of second port sets are to each communicate at a first maximum bandwidth when fully utilized and the first port set is to communicate at a second maximum bandwidth when fully utilized, the second maximum bandwidth higher than the first maximum bandwidth.

8. A processor comprising:
a first router comprising a plurality of port sets, wherein the plurality of port sets comprise:
a first port set comprising an input port and an output port;
a second plurality of port sets, wherein each port set of the second plurality of port sets comprises: an input port to be coupled to the output port of the first port set; and an output port to be coupled to the input port of the first port set; and wherein the input port of the first port set is to simultaneously provide circuit-switched data from a core of the processor to each port set of the second plurality of port sets, and wherein the output port of the first port set is to simultaneously provide circuit-switched data from each port set of the second plurality of port sets to the core, wherein an output port of a port set of the second plurality of port sets operates in accordance with a credit-2 packet system, wherein a number of sent requests from the output port can exceed the number of received grants by two, and an input port of the port set of the second plurality of port sets operates in accordance with a credit-1 packet system, wherein the input port may not send an additional request until a grant is received.

9. A processor comprising:
a first router comprising a plurality of port sets, wherein the plurality of port sets comprise:
a first port set comprising an input port and an output port;
a second plurality of port sets, wherein each port set of the second plurality of port sets comprises: an input port to be coupled to the output port of the first port set; and
an output port to be coupled to the input port of the first port set; and
wherein the input port of the first port set is to simultaneously provide circuit-switched data from a core of the processor to each port set of the second plurality of port sets, and wherein the output port of the first port set is to simultaneously provide circuit-switched data from each port set of the second plurality of port sets to the core, wherein the processor further comprises:
a first set of signal lines coupling a first input port of the second plurality of port sets to the output port of the first port set, the first set of signal lines dedicated to carrying circuit-switched data from the first input port of the second plurality of port sets to the output port of the first port set; and
a second set of signal lines coupling a second input port of the second plurality of port sets to the output port of the first port set, the second set of signal lines dedicated to carrying circuit-switched data from the second input port of the second plurality of port sets to the output port of the first port set; and
wherein the circuit-switched data simultaneously provided from each port set of the second plurality of port sets to the core comprises first circuit-switched data communicated over the first set of signal lines and second circuit-switched data communicated over the second set of signal lines.

* * * * *